United States Patent

Bennett

[15] 3,642,090
[45] Feb. 15, 1972

[54] MARINE IMPLODER-TYPE ACOUSTIC IMPULSE GENERATOR

[72] Inventor: Grant S. Bennett, Ossineke, Mich.
[73] Assignee: Western Geophysical Company of America, Houston, Tex.
[22] Filed: July 23, 1969
[21] Appl. No.: 844,019

[52] U.S. Cl. .................................. 181/0.5 H, 340/12 R
[51] Int. Cl. ...........................................G01v 1/00
[58] Field of Search ....................181/0.5 H; 340/12 R

[56] References Cited

UNITED STATES PATENTS

| | | | |
|---|---|---|---|
| 3,249,177 | 4/1966 | Chelminski | 181/0.5 H |
| 3,277,437 | 10/1966 | Bouyoucos | 181/0.5 H |

Primary Examiner—Rodney D. Bennett, Jr.
Assistant Examiner—S. C. Buczinski
Attorney—Michael P. Breston, Alan C. Rose and Alfred B. Levine

[57] ABSTRACT

An acoustic impulse generator for producing in a liquid body acoustic impulses useful, for example, in geophysical explorations. The generator includes a housing which defines an enclosed chamber having a movable wall. Driving means in one operating condition cause the movable wall to execute a forward stroke in the liquid body thereby storing potential energy in the liquid body and in the generator. The driving means in another operating condition allow the movable wall to execute a return stroke in a relatively short time interval thereby generating an acoustic impulse.

10 Claims, 3 Drawing Figures

PATENTED FEB 15 1972
3,642,090
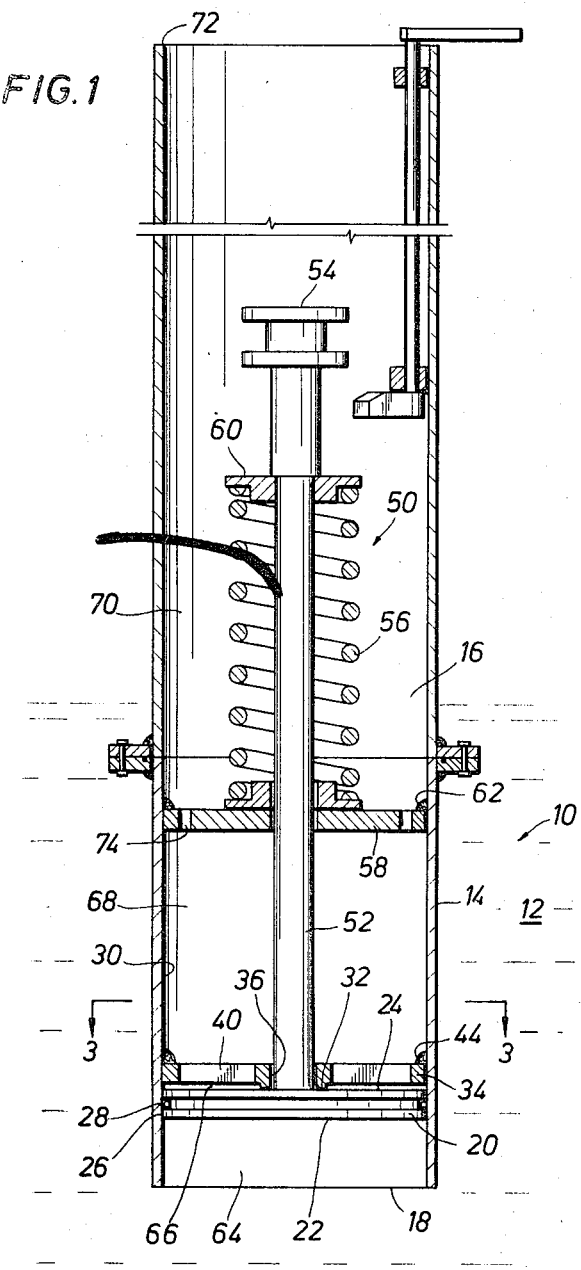
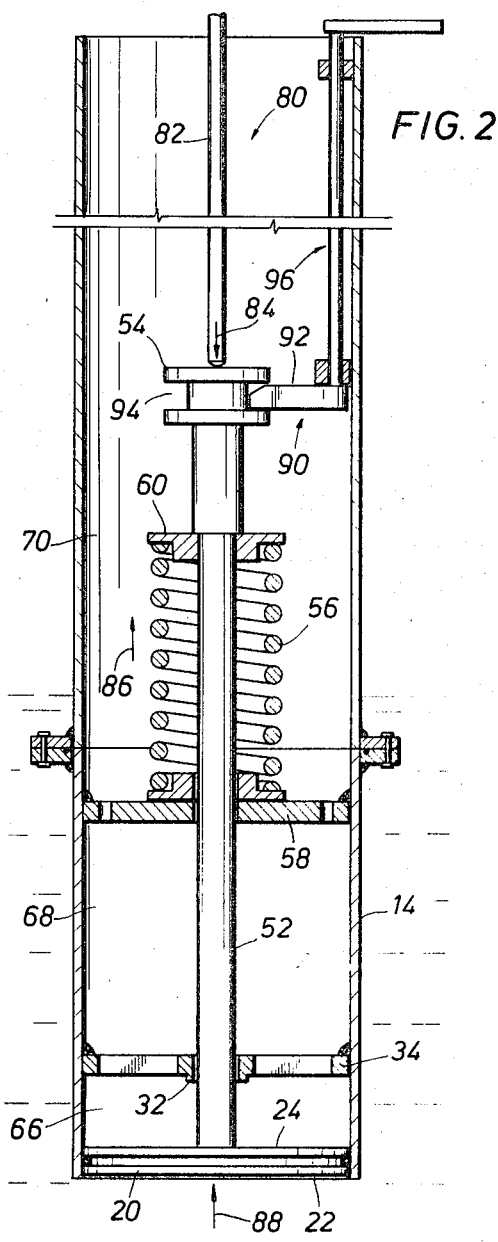
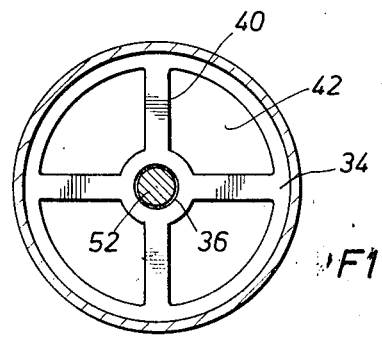
Grant S. Bennett
INVENTOR
BY Michael P. Breston
ATTORNEY

MARINE IMPLODER-TYPE ACOUSTIC IMPULSE GENERATOR

BACKGROUND OF THE INVENTION

Acoustic impulse generators for producing in a liquid acoustic impulses are known in the art. U.S. Pat. No. 3,369,627 shows two adjacently positioned circular plates towed in sea water. Driving means cause the lower plate to execute a forward stroke relative to the upper plate in a relatively short time interval thereby creating a cavity between the plates. The violent collapse of this cavity by the surrounding water generates an acoustic impulse which propagates throughout the body of water. Subsequent to the generation of the acoustic impulse, the driving means cause the lower plate to execute a relatively slow return stroke.

In such a generator, the power required to execute a very fast forward stroke against the ambient water pressure is very great. Such generators, therefore, require relatively large, high-power actuators. Moreover, since the bottom plate which executes the forward stroke is completely exposed to the open water at the time when the surrounding water rushes in to collapse the cavity, both plates rapidly experience structural fatigue.

U.S. Pat. No. 3,277,437 shows another type of acoustic generator submerged in a body of water which includes an enclosed chamber having a movable piston. Under the influence of a fluid-pressure-and-vacuum source the piston executes a forward stroke. The piston is then permitted to execute a return stroke thereby converting potential energy, stored in the liquid body during the forward stroke, into kinetic energy which makes available energy for the formation of an acoustic shock wave when the piston comes to rest. In this type of generator the acceleration of the piston during the return stroke is relatively limited.

SUMMARY OF THE INVENTION

In accordance with this invention there is provided a generator for generating high-power acoustic impulses when submerged in a liquid body. The generator comprises a housing which defines an enclosed chamber having a movable wall. Driving means are coupled to the wall to cause the wall to execute a forward stroke in the liquid body. During the forward stroke of the wall potential energy is stored both in the ambient liquid body and in the generator. The forward stroke may be relatively slow. The combined potential energy stored in the generator and in the liquid body is released upon command to cause the wall to execute a return stroke in a relatively short time interval. The greater the potential energy stored in the generator, the greater will be the acceleration of the wall during the return stroke. Consequently, the wall can be made to move away from the liquid body into the enclosed chamber faster than the liquid body can follow the wall. A cavity is then formed between the wall and the surrounding liquid body. The surrounding liquid rushes in to fill this cavity, and in so doing a high-power acoustic impulse becomes generated and propagated throughout the liquid body.

In accordance with a specific embodiment of this invention there is provided an acoustic impulse generator having a housing which defines a chamber having a bore in which a piston is slidably mounted. Driving means are coupled to the piston. The driving means include potential energy storage means such as a spring. The driving means in one operating condition cause the piston to execute a forward stroke against the ambient pressure exerted by the liquid body and against the resistance offered by the spring. As a result during the forward stroke potential energy is stored in the liquid body and in the spring. The driving means in another operating condition allow the piston to execute a return stroke. Under the influence of the potential energy stored in the spring, the acceleration of the piston can be made sufficiently high to create a cavity between the liquid body and the piston, i.e., the piston during the return stroke can be made to move away from the liquid body faster than the liquid can follow the piston. The surrounding liquid then violently moves in to fill this cavity. A portion of the kinetic energy of the moving in liquid becomes converted into acoustic energy in the form of a relatively high-level, low-frequency pulse. Thus the violent collapse of this cavity produces an acoustic impulse which propagates throughout the liquid medium.

BRIEF DESCRIPTION OF THE DRAWINGS

FIG. 1 is a cross-sectional view of an acoustic impulse generator embodying the principles of this invention and showing the piston at its rest position;

FIG. 2 shows the generator in its cocked position; and

FIG. 3 is a view taken on line 3—3 in FIG. 1.

Referring to the drawings, an acoustic impulse generator, generally designated as 10, is shown submerged in a liquid medium such as sea or ocean water 12. While generator 10 can be completely submerged, it will be described hereinafter as being partially submerged in the water body 12 to a given depth below the air/water interface. This depth will be referred to as the operating depth characterized by an operating ambient pressure.

Generator 10 includes a housing 14 which, for convenience of construction, is made cylindrical in form. Housing 14 defines an inner bore 16 also of cylindrical configuration. Bore 16 is opened at one end 18 to the water medium 12. A piston 20 is slidably and sealingly mounted in bore 16. Piston 20 has an outer face 22 and an inner face 24. On the cylindrical outer wall 26 of piston 20 is provided a suitable sliding seal 28 to assure a sealing relationship between the outer cylindrical wall 26 of piston 20 and the inner cylindrical wall 30 of housing 14.

Piston 20 is adapted to execute a forward stroke from its rest position, as shown in FIG. 1, to its cocked position as shown in FIG. 2 and, upon "firing" generator 10, to return very rapidly from its cocked position to its rest position. In the rest position the inner face 24 of piston 20 rests against an annular shoulder 32 provided by a centering annular ring 34 which has a cylindrical opening 36. Radially extending ribs 40 define therebetween openings 42. Ring 34 is fixedly attached to the cylindrical wall 30 as by welding at 44.

To cause piston 20 to execute its strokes, there is provided a driving system generally designated as 50, which includes an actuating member such as a push rod 52 attached at one end to piston 20. The other end of push rod 52 may be provided with an enlarged head 54. Rod 52 is spring-loaded by suitable spring means such as a coil spring 56 clampingly positioned between a wall 58 and a radially extending shoulder 60. Wall 58 is fixedly attached to the inner cylindrical wall 30 as by welding at 62.

As thus far described, bore 16 is divided into a plurality of chambers: chamber 64 between outer face 22 of piston 20 and the open end 18, chamber 66 between inner face 24 of piston 20 and centering ring 34, chamber 68 between ring 34 and wall 58, and chamber 70 between wall 58 and the other end 72 of bore 16. To prevent back pressure on inner face 24 of piston 20, there is provided open communication between chambers 66 and 68 through openings 42, and between chambers 68 and 70 through vent holes 74 in wall 58.

Rod 52 may be pushed downwardly, against the resistance offered by spring 56 and the operating ambient pressure, by a suitable force exerting means generally designated as 80, which may include a cocking rod 82 coupled to a force generator (not shown). Cocking rod 82 exerts a downwardly directed force, designated by arrow 84, against head 54. The required force 84 is greater than the sum of the upwardly directed spring resistance force 86 and the upwardly directed force 88 produced by the ambient operating pressure in the water medium 12.

The displacement of piston 20 from its rest position to its cocked position may take place over a relatively long time period as compared to the duration of the acoustic impulse generated during the return stroke. To "fire" the acoustic impulse generator 10, the force exerting means 80 is removed, as by rapidly removing cocking rod 82.

In one embodiment, the force exerting means 80 further included a quick-release, latching mechanism, generally designated as 90 which, in its simplest form, may include a tongue 92 for slidably and releasably engaging an annular groove 94 in head 54. Tongue 92 is moved in or out of groove 94 by a crank mechanism, generally designated as 96, attached to the wall 30 of housing 14.

The operation of the acoustic impulse generator 10 will be described in connection with geophysical or seismic exploration where high-power, short-duration impulses are desired. For seismic use, generator 10 would normally be attached to a towed platform and would be cyclically operated to produce a train of acoustic or seismic impulses into the water medium 12. The open end 18 of bore 16 is positioned at a given operating depth below the air/water interface. While bore 16 is shown as having an upper open end 72, it will be appreciated, as previously mentioned, that end 72 may be closed to allow housing 14 to become completely submerged in the water medium 12.

One complete cycle of operation will be described by starting with generator 10 in its loaded ready to "fire" condition. In that condition: piston 20 is in its cocked position as shown in FIG. 2, quick-release latch mechanism 90 engages head 54, and force producing means 80 is removed or very greatly reduced as compared to the other forces involved.

Following the fire command signal provided by the seismic equipment on board the seismic boat, crank mechanism 96 is actuated to disengage tongue 92 from rod head 54. The characteristic parameters of spring 56 are such that the upwardly directed force 86 is much greater than force 88 produced by the ambient pressure of the water medium 12 against the outer face 22 of piston 20. As a consequence, spring 56 lifts up push rod 52 very rapidly. The lifting of push rod 52 causes piston 20 to execute its return stroke from its cocked position to its rest position. Thus the potential energy stored in spring 56 by push rod 52 during the downward stroke is restored by spring 56 to push rod 52 during the upward stroke.

The velocity and acceleration of a given piston 20 are determined primarily by the characteristic parameters of spring 56. The volume of the column of water displaced during the downward stroke of piston 20 from chamber 64 is determined by the product of the area of face 22 of piston 20 and of the length of the stroke. On the other hand, the potential energy stored in the displaced water column is proportional to the product of the ambient pressure in the water medium 12 at the open end 18 and the volume of the displaced water column.

Since piston 20 executes its return stroke in a relatively short time period, piston 20 moves away from the surrounding water medium 12 faster than ambient water can enter through the open end 18 into chamber 64. Consequently, there is formed a cavity in chamber 64. The potential energy stored in the displaced column of water is now available to collapse violently this cavity and to produce a powerful acoustic impulse which becomes propagated through the water medium 12.

To move piston 20 from its rest position to its cocked position, the force-producing means 80 is applied to head 54. Piston 20 will then execute its forward stroke in a time interval which may be relatively long compared to the time interval of the return stroke. The force-producing means 80 thus causes potential energy to become stored during the forward stroke both in the spring 56 and in the water column displaced from chamber 64. This completes one cycle of operation.

In practice generator 10 is operated repetitively to produce in the water body 12 a train of acoustic impulses which become reflected from the earth formations lying below the water medium. The recording and processing of the reflected signals from the underlying earth formations allow the geologist to study these formations.

While this invention has been described in connection with illustrative embodiments it will be apparent to those skilled in the art that various modifications thereof may be made and all such modifications are intended to be covered by the claims appended hereto.

What I claim is:

1. A generator for generating high-power acoustic impulses when submerged in a liquid body, said generator comprising:
   housing means defining an enclosed chamber having a movable wall;
   driving means, including potential energy storing means, adapted to move said movable wall,
      said driving means in one operating condition causing said movable wall to execute a forward stroke in said liquid body thereby storing potential energy in said liquid body and in said storing means, and
      said driving means in another operating condition allowing the potential energy stored in said generator to cause said movable wall to execute a return stroke in a relatively short time interval thereby generating said acoustic impulse,
         said time interval being shorter than the time interval within which the movable wall can execute the return stroke in response to the potential energy stored in said liquid body.

2. The generator of claim 1 wherein,
   said time interval is sufficiently short to allow for the formation of a cavity between said movable wall and said liquid body, and
   the filling of said cavity by the surrounding liquid body generates said acoustic impulse.

3. The generator of claim 1 wherein said movable wall is a piston slidably mounted in said chamber.

4. The generator of claim 3 wherein,
   said housing means includes a fixed wall, and
   said chamber is defined between said fixed wall and said piston.

5. A generator for generating a high-power acoustic impulse when submerged in a liquid body, said generator being adapted to store potential energy, said generator comprising:
   housing means defining an enclosed chamber having a piston slidably mounted in said chamber;
   said housing means including a fixed wall, and said chamber being defined between said fixed wall and said piston;
   driving means adapted to move said movable wall, said driving means including,
      a push rod having one end coupled to said piston and another end extending through said fixed wall, and
      a spring means between said fixed wall and said other end,
   said driving means in one operating condition causing said movable wall to execute a forward stroke in said liquid body thereby storing potential energy in said liquid body and in said spring means, and
   said driving means in another operating condition allowing said movable wall to execute a return stroke in a relatively short time interval thereby generating said acoustic impulse.

6. The generator of claim 5 wherein,
   said driving means include latching means to retain said piston in its position at the end of said forward stroke, and
   said latching means controllably releasing said piston for execution of said return stroke.

7. A relatively high-power generator for generating an acoustic seismic impulse when submerged in a liquid medium comprising:
   a housing having a bore therein,
      said bore being open at one end to said liquid medium;
   a piston slidably mounted in said bore,
      said piston having an outer face and an inner face;
   actuation means coupled to said piston for causing said piston to execute a forward stroke against the ambient liquid pressure;

spring means reciprocatingly cooperating with said actuation means;

said actuation means storing energy in said spring means during said forward stroke; and said spring means causing said piston to execute a very rapid return stroke to form a cavity between said liquid medium and said outer face.

8. The generator of claim 7 wherein, said liquid medium violently collapses said cavity to produce said acoustic impulse.

9. The generator of claim 7 wherein, said actuation means include controllable latching means to releasably retain said piston in its position at the end of said forward stroke.

10. A method of generating a sharp high-power acoustic impulse in a body of water comprising the steps of:

positioning an impulse generator in the body of water, storing potential energy in the impulse generator and in the body of water surrounding the impulse generator, and very rapidly converting the combined potential energy stored in the generator and in the body of water into acoustic energy to thereby generate said acoustic impulse in the body of water.

* * * * *